March 27, 1928.

J. L. DONLAY 1,664,105

TRAFFIC SIGNAL FOR MOTOR VEHICLES

Filed May 25, 1927

Inventor
by J. L. Donlay
Hazard and Miller
Attorneys

March 27, 1928.
J. L. DONLAY
1,664,105
TRAFFIC SIGNAL FOR MOTOR VEHICLES
Filed May 25 1927      3 Sheets-Sheet 2
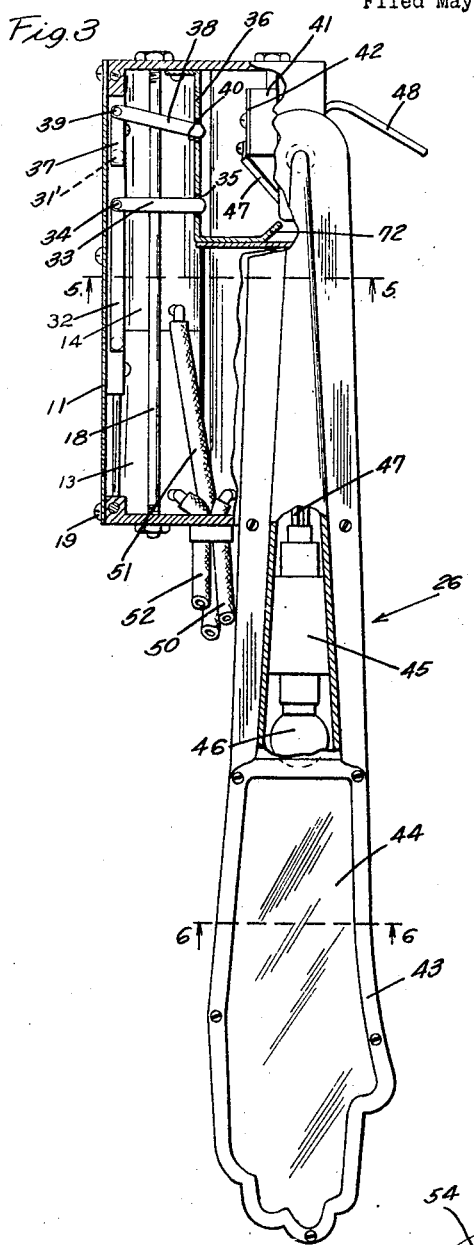
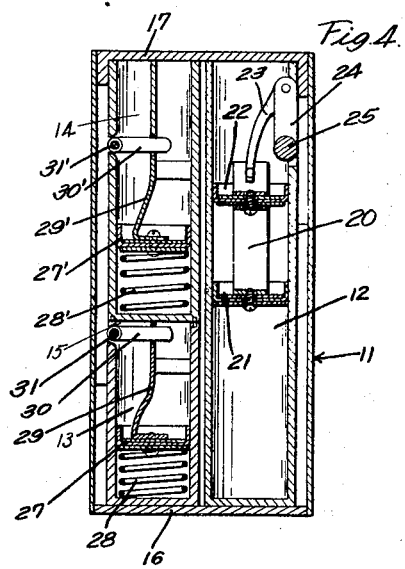
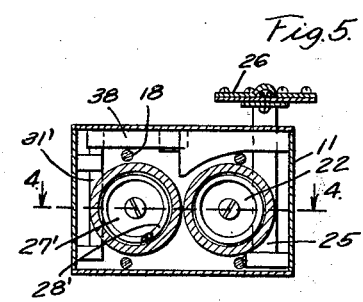
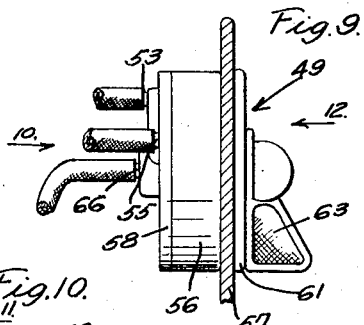
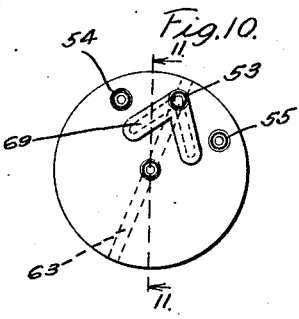
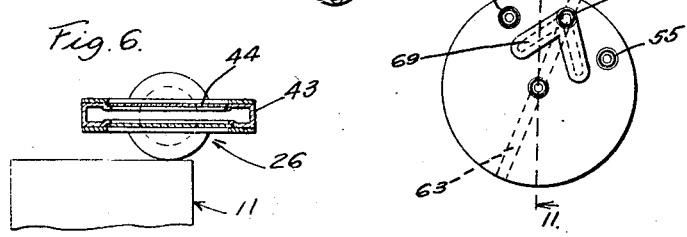
INVENTOR
By J. L. Donlay
Hazard and Miller
ATTORNEYS March 27, 1928.  1,664,105
J. L. DONLAY
TRAFFIC SIGNAL FOR MOTOR VEHICLES
Filed May 25 1927  3 Sheets-Sheet 3
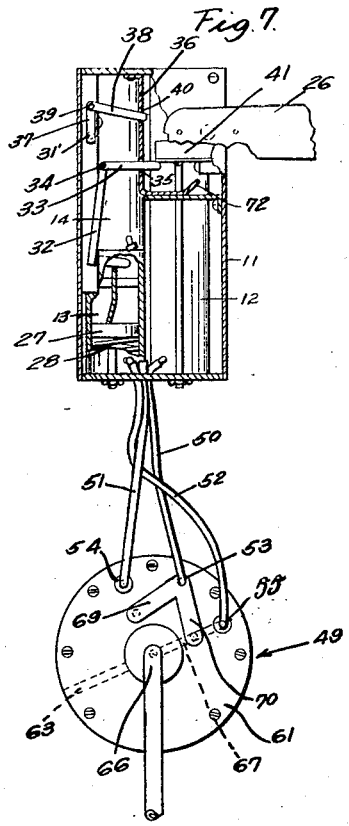
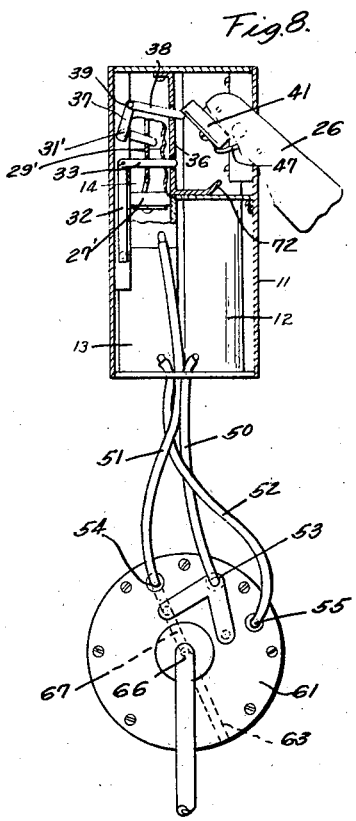
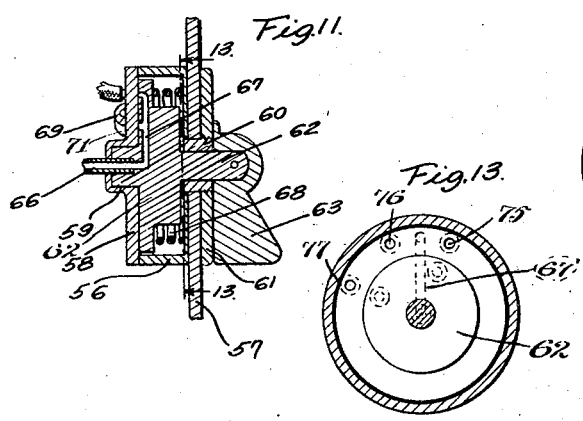
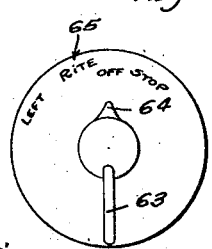
INVENTOR
J. L. Donlay
By Hazard and Miller
ATTORNEY Patented Mar. 27, 1928.

1,664,105

UNITED STATES PATENT OFFICE.

JAMES L. DONLAY, OF HYNES, CALIFORNIA.

TRAFFIC SIGNAL FOR MOTOR VEHICLES.

Application filed May 25, 1927. Serial No. 194,062.

My invention is a traffic signal for motor vehicles to give a semaphore type of signal by a swinging arm.

An object of my invention is a swinging arm type of semaphore signal actuated by the vacuum system of a motor vehicle, the vacuum being created by the operation of the engine, and having a control switch convenient to the car operator.

A more particular object of my invention is the construction of a swinging semaphore signal operated by a vacuum in which the arm is moved to various different positions through the medium of one cylinder of the piston and is stopped at various signaling positions by other vacuum controls of the cylinder and piston construction, these vacuum devices being manipulated by a control valve.

In constructing my signal I have a suitable box like structure mounted on the side of the vehicle, preferably adjacent the wind shield, and in this structure I have a plurality of cylinders. One of these cylinders is for a long stroke and has a piston mounted therein, the piston being connected by suitable construction to a swinging semaphore arm. The other two cylinders are preferably in alignment and each have pistons therein. Each cylinder is connected by a flexible hose to a control valve, and the control valve is connected to the vacuum system of the automobile, such vacuum system usually being operated by the running of the engine. In one position of the control switch the long stroke cylinder operates to swing the semaphore arm the full length of the stroke to give one signal, this being preferably a conventional right hand turn when the device is mounted on the left side of the vehicle. A partial stroke may be given by energizing the long stroke and one of the short stroke cylinders, thus actuating a stopping mechanism which stops the long stroke piston in either of two positions to lock the arm for giving a downwardly inclined stop signal or a horizontal position for a left turn signal.

My invention will be more readily understood from the following description and drawings, in which:

Figure 3 is a front elevation partly broken away of my signal showing the semaphore arm and part of the box structure having the pistons therein.

Figure 4 is a vertical longitudinal section through the piston box taken on the line 4—4 of Fig. 5 in the direction of the arrows.

Figure 5 is a horizontal section on the line 5—5 of Fig. 3 in the direction of the arrows.

Figure 6 is a section on the line 6—6 of Fig. 3 in the direction of the arrows, through the semaphore arm.

Figure 7 is an inside elevation partly broken away of the piston box showing part of the semaphore arm, the outside wall, and the control switch, showing the signal in one position with the switch to correspond.

Figure 8 is a view similar to Fig. 7 showing the signal in another position.

Figure 9 is a side elevation of the control valve.

Figure 10 is a back view of the control valve taken in the direction of the arrow 10 of Fig. 9.

Figure 11 is a section through the control valve on the line 11—11 of Fig. 10.

Fig. 12 is a front elevation of the control valve in the direction of the arrow 12 of Fig. 9.

Figure 13 is a section through the valve on the line 13—13 of Fig. 11.

Figure 1:
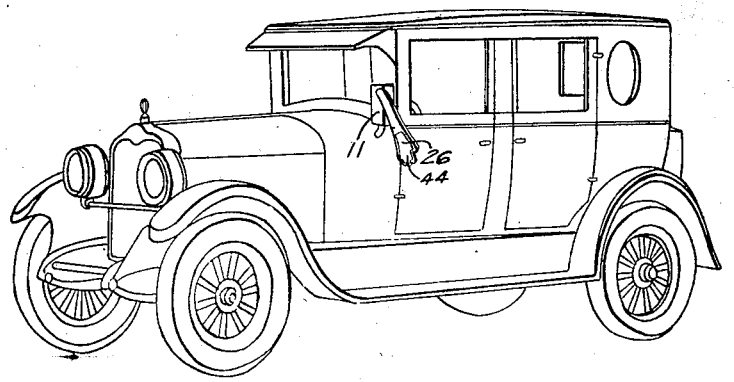
Figure 1 is a perspective view of the exterior of a vehicle with my signal attached thereto.
Figure 2:
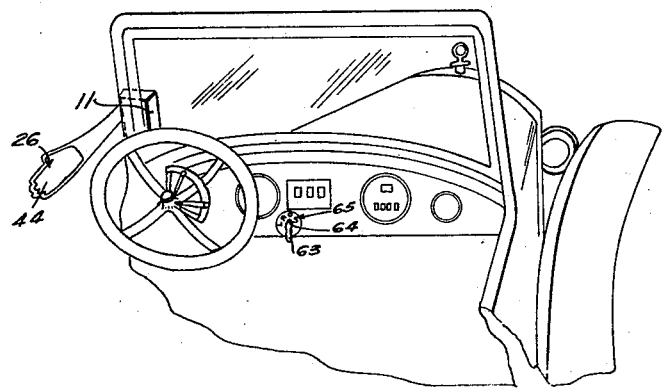
Figure 2 is a perspective view from the inside of the vehicle looking forwardly.

The main fixed structure of my signal comprises a cylinder holding box 11 which is preferably formed rectangular and may be secured to the side of a vehicle, preferably adjacent the wind shield. This box contains a long cylinder 12 and two short cylinders 13 and 14, these latter being in alignment and separated by a central head 15. The cylinders rest on the base 16 of the box and have a head 17 on the top of the cylinders 12 and 14, the base and the head being secured together preferably by bolts 18 and the sides of the box being secured to each other and to the base and head by screws 19. The main cylinder contains a piston construction 20 which is formed of double pistons 21 and 22 connected together. This piston structure is connected by a link 23 to a lever 24, the latter being rigidly secured to a rock shaft 25, and secured to this rock shaft is the semaphore arm designated generally by the numeral 26.

In the cylinder 13 there is a piston 27 which is actuated upwardly by a spring 28. Extending upwardly from the piston 27 there is a rod 29 which engages a lever 30, the lever passing through a slot in the rod 29. This lever is mounted on a shaft 31. The upper cylinder 14 has a similar construction, the corresponding elements being designated by the numbers 27', 28', 29', 30', and 31', each however being independent one of the other. An arm 32 is rigidly secured to the lower shaft 31 and at its upper end there is a slide bar 33 connected thereto by a swivel pin 34, this slide bar operating through an aperture 35 in a wall 36 in the upper part of the main box 11.

The upper shaft 31' has an arm 37 connected thereto with a slide bar 38 pivotally connected by a pin 39, this slide bar operating through an aperture 40 in the wall 36.

The semaphore arm 26 is constructed substantially as follows:

As above mentioned, this arm is mounted on the pivot shaft 25 and has at its upper end an insulating block 41 having a conducting plate 42 thereon. The lower part 43 of the arm is hollow having transparent plates 44 on each side, as shown in Fig. 6, there being positioned above this hollow part a lamp socket 45 with an electric lamp 46 therein. One lead 47 from this lamp socket extends to the conducting plate 42 to form a ground connection, the other lead 48 connecting to a source of power.

There are three flexible pipes connecting between the cylinders and the control valve, designated generally by the numeral 49. The pipe 50 is connected to the lower end of the long stroke cylinder 12, the pipe 51 to the lower end of the upper cylinder 14, and the pipe 52 to the lower end of the lower cylinder 13. These pipes are connected to the valve structure respectively at the connections 53, 54 and 55.

The valve details are substantially as follows, having reference particularly to Figs. 7, 8, 9, 10, 11 and 12.

A suitable housing 56 is preferably mounted on a panel 57, such as an instrument board, this housing having a rear wall 58 with a journal recess 59 therein, and a bushing 60 extends through an opening in the panel, there being an index plate 61 on the front of the panel. A core 62 has a rearward extension mounted in the journal recess 59 and a stem 62 journaled on the bushing 60. An operating handle 63 is connected to the stem in front of the plate 61, and has a pointer 64, this plate having indicia 65 thereon indicating an off position, a stop, and right and left turn positions. A vacuum pipe 66 is connected to the rear part of the housing, preferably entering through the recessed part 59, and communicates with a duct 67 in the core or body of the valve. This core, by means of a compression spring 68, is pressed towards the rear of the housing. On the rear wall 58 there are two ducts 69 and 70 which lead from a position between the center and the connections 54 and 55 of the different flexible pipe connections. The duct 67 is indicated in Figs. 7 and 8 in different positions to give different signals, the handle 63 also being indicated dotted.

When the handle is in the position shown in Fig. 12 the pointer 64 points to the off position and the duct 67 would be in a vertical position and hence not in communication with any of the connections 53, 54 or 55. When the handle is switched to the position giving the right hand signal pointing to the word RIGHT, the duct 67 is in the position shown in Fig. 10, in which case the duct 67 leads to the connection 53 of the flexible pipe 50, such pipe leading to the base of the long stroke cylinder 12.

The operation, therefore, subjects this cylinder to the vacuum system and creates a vacuum in the lower part of the cylinder, whereby the atmospheric air forces the double piston construction downwardly and this pulls on the link 23, swinging the arm 24 and rocking the shaft 25, which actuates the semaphore arm 26. As there is nothing to interfere with this action, the piston has a long stroke and swings the semaphore arm until it points upwardly substantially at an angle of forty-five degrees above the horizontal and thus gives the conventional right turn signal when mounted on the left hand side of the vehicle. When the signal arm is tilted up in the above described position, the conducting plate 42 contacts with a fixed electric contact 72 which gives a ground connection for one side of the electric circuit and hence the lamp is illuminated, the other side of the circuit being through the lead 48.

If a left hand turn is to be made, the handle 63 is turned until the pointer 64 points to the word LEFT, and in such case the duct 67 occupies the position shown dotted in Fig. 7, in which case the duct connects directly to the connection 55 of the flexible pipe 52. The duct 70 also connects through a lateral passage 71 in the core to the duct 67, the duct 70 being connected at the connection 53 to the flexible pipe 50. As above mentioned, the pipe 50 connects to the lower part of the long stroke cylinder 12 and the pipe 52 to the base of the lower short stroke cylinder 13. Therefore, the pistons in both of these cylinders are subject to the vacuum system and are drawn downwardly.

When the rod 29 moves down with the piston 27, it rocks the arm 30, rocking the shaft 31, which in turn rocks the arm 32 and shifts the slide bar 33, this slide bar coming into a position engaging the conducting plate 42 on the back of the insulating block 41, as shown in Fig. 7, and thus stopping the downward movement of the piston 20 in the long stroke cylinder 12 and retaining the semaphore arm in the horizontal positions, as shown in Fig. 7. At the same time this makes a ground electrical connection from the plate 42 through the slide bar and the structure of the housing, giving a return for the electric circuit through the lead 48 to the lamp socket 45 and thus switching on the electric current illuminating the semaphore arm.

If a stop signal is to be given, the switch is moved so the pointer 64 points to the word STOP, the duct 67 in this case being as shown in Fig. 8, and connects to the connection 54 of the pipe 51, this latter leading to the bottom of the upper short stroke cylinder 14. At the same time through the medium of the passage 71, the duct 69, the connection 53 and the pipe 50, the long stroke cylinder is connected to the vacuum system. Hence the double piston 20 and the piston 27' are drawn downwardly. The piston 27' functions in the same manner as the piston 27, the rod 29' actuating the arm 30' and turning the shaft 31'. This in its turn rocks the arm 37 sliding the slide bar 38 through the opening 40 and engaging the plate 42 on the insulating block 41, as shown in Fig. 8, thus restraining the movement of the semaphore arm and stopping it when inclined in a direction of forty-five degrees below the horizontal. As above mentioned, this establishes a return electric circuit illuminating the lamp. When the switch is turned to the off position, the springs 28 and 28' force the pistons 27 27' to their upper position and hence retract the slide bars 33 and 38 and the weight of the semaphore arm draws the double pistons 20 to their upper positions.

From the above description, together with the drawings, it will be seen that I have developed a simple type of semaphore signal and operating mechanism therefor with a simple type of controlling valve. The driver merely needs to switch the handle of the valve into the various positions shown as "stop", "right", "left", and the semaphore arm is brought automatically to these various positions due to the suction from the vacuum system of the motor vehicle and the arm is held in such positions until the valve is turned to the off position. At the same time the light is lit, attracting the attention of other drivers or pedestrians.

It is desirable to vent the cylinders when they are not connected to the vacuum so that air may be drawn therein to allow ready upward movement of the cylinders, and to this end I have a series of ports or openings 75, 76 and 77 in the core 62. These openings register respectively with the connections 54, 53 and 55 so that when the valve is turned into the off position with the duct 67 out of register with any of the above said connections, there is a direct air passage through the periphery of the core 62 and through the flexible pipes 51 and 52, thus allowing air to enter the cylinders and force said cylinders to their inactive position.

Various changes may be made in the principles of my invention without departing from the spirit thereof, as set forth in the description, drawings and claims.

I claim:

1. A signal comprising in combination a plurality of cylinders, each having a piston, a movable signal operatively connected to one of the pistons, means to connect said cylinders to a vacuum device, and means to control one cylinder to shift the signal and another cylinder to stop the signal in a predetermined position.

2. A signal comprising in combination a plurality of cylinders, each having a piston, a vacuum control valve, means connecting said valve to each of the cylinders, a movable signal connected to one of the pistons, the control valve when in one position allowing operation of the one piston connected to the signal, and in another position to allow actuation of said latter piston, and another piston to stop the signal in a predetermined position.

3. A signal comprising in combination a long stroke cylinder and a pair of short stroke cylinders, a vacuum control valve having a separate connection to each of said cylinders, a piston in each cylinder, the piston in the long stroke cylinder being connected to a pivoted semaphore arm, the control valve in one position causing operation of the long stroke cylinder and in two other positions causing operation of the two short stroke cylinders, and means connected with the pistons of said latter cylinders to stop the semaphore arm in two predetermined positions.

4. A traffic signal comprising in combination a long stroke cylinder and a plurality of short stroke cylinders, each having pistons, a vacuum control valve having a separate connection to each of the cylinders, a pivoted semaphore arm connected to the piston in the long stroke cylinder, said control valve being positionable to form a connection from a source of vacuum to the long stroke cylinder or to either of the short stroke cylinders, and means operated by said latter cylinders to restrain the movement of the semaphore arm to give two predetermined signals.

5. A signal comprising in combination a long stroke cylinder and a pair of short stroke cylinders, the latter being in alignment, a piston for each cylinder, a vacuum control valve having a connection to each of the cylinders, a pivoted semaphore arm connected to the piston in the long stroke cylinder, slide bars connected to the pistons in each of the short stroke cylinders, the said valve being operable to connect the long stroke cylinder to a vacuum source or to connect the long stroke cylinder and one of the short stroke cylinders to said source, said slide bars being adapted to restrain the movement of the semaphore arm to give two predetermined signals, the third signal being given by the movement of the piston in the long stroke cylinder.

6. A traffic signal comprising in combination a long stroke cylinder and a pair of short stroke cylinders, the latter being in alignment, a piston in each cylinder, a pivoted semaphore arm, means interconnecting the piston in the long stroke cylinder and said arm to operate the latter, a rock shaft connected to each of the pistons in the short stroke cylinder, slide bars connected to each of the rock shafts, and means to interconnect the long stroke cylinder with a source of vacuum or the long stroke and one of the other cylinders with said source whereby the semaphore arm may be operated through a long distance or through a shorter distance to give predetermined signals.

7. A traffic signal, as claimed in claim 6, the means to interconnect the cylinders with the source of vacuum comprising a vacuum valve having a rotatable core with a duct therein connected to a source of vacuum, a conduit connecting the valve and each of the cylinders, and means to connect said duct in the core to the conduit leading to the long stroke cylinder or to the conduits to the long stroke cylinders and to one of the short stroke cylinders.

8. In a signal a vacuum control valve having a rotatable core with a first duct therein connected to a source of vacuum, a plurality of outlets connected to conduits, and a pair of second ducts connecting one of the outlets to the first duct whereby said first duct may connect the source of vacuum to one of the conduits or to two of the conduits in accordance with the position of the first duct in relation to said outlets.

9. A traffic signal comprising in combination a long stroke cylinder and a pair of short stroke cylinders, a piston in each cylinder, a pivoted semaphore arm, means interconnecting the piston in the long stroke cylinder with said arm to operate the latter, means connected to the pistons in the short stroke cylinders to interrupt the movement of the semaphore arm, a valve having a rotatable core with a duct therein, a pipe connection from the valve to each of the cylinders, means connecting said duct to a vacuum device, said valve being operable to form a connection with each of the said cylinders and the source of vacuum, and openings through said core to connect to the cylinders when the valve is in its neutral position.

In testimony whereof I have signed my name to this specification.

JAMES L. DONLAY.